United States Patent [19]
Dev et al.

[11] Patent Number: 5,754,532
[45] Date of Patent: *May 19, 1998

[54] USE OF MULTIPOINT CONNECTION SERVICES TO ESTABLISH CALL-TAPPING POINTS IN A SWITCHED NETWORK

[75] Inventors: Roger Dev, Durham, N.H.; Prasan Kaikini, Cambridge, Mass.; Jason Jeffords, Dover; Wallace Matthews, North Hampstead, both of N.H.

[73] Assignee: Cabletron Systems, Inc., Rochester, N.H.

[*] Notice: The term of this patent shall not extend beyond the expiration date of Pat. No. 5,627,819.

[21] Appl. No.: 747,456

[22] Filed: Nov. 12, 1996

Related U.S. Application Data

[63] Continuation of Ser. No. 370,158, Jan. 9, 1995, Pat. No. 5,627,819.

[51] Int. Cl.$^6$ .............................. H04Q 1/24; H04L 12/56
[52] U.S. Cl. ...................... 370/250; 370/254; 370/351
[58] Field of Search ..................... 370/244, 250, 370/254, 260, 265, 351, 355, 395, 396, 397, 408, 255, 264; 379/202, 206

[56] References Cited

U.S. PATENT DOCUMENTS

| | | | |
|---|---|---|---|
| 4,939,509 | 7/1990 | Bartholomew et al. | 370/62 |
| 5,115,495 | 5/1992 | Tsuchiya et al. | 370/94.1 |
| 5,195,086 | 3/1993 | Baumgartner et al. | 370/264 |
| 5,195,087 | 3/1993 | Bennett et al. | 370/62 |
| 5,261,044 | 11/1993 | Dev et al. | 395/357 |
| 5,305,312 | 4/1994 | Fornek et al. | 370/62 |
| 5,315,580 | 5/1994 | Phaal | 370/17 |
| 5,357,508 | 10/1994 | Le Boudec et al. | 370/409 |
| 5,373,549 | 12/1994 | Bales et al. | 370/260 |
| 5,485,455 | 1/1996 | Dobbins et al. | 370/255 |
| 5,627,819 | 5/1997 | Dev et al. | 370/250 |

FOREIGN PATENT DOCUMENTS

| | | | |
|---|---|---|---|
| 0453128 A2 | 10/1991 | European Pat. Off. | H04L 12/56 |
| 0462691 | 12/1991 | European Pat. Off. | H04L 12/26 |
| 95/34158 | 12/1995 | WIPO | H04M 3/22 |

OTHER PUBLICATIONS

*JP.A.61 263350, 21 Nov. 1986, Patent Abstracts Of Japan vol. 011, No. 117 (E-498) 11 Apr. 1987 (Hitachi Ltd).

*Primary Examiner*—Chau Nguyen
*Attorney, Agent, or Firm*—Wolf, Greenfield & Sacks, P.C.

[57] ABSTRACT

Method and apparatus for providing a call-tapping point in a switched network with point-to-multipoint functionality. The tapping point is added as an additional destination for data being sent from a source node to a first destination node. The tapping point is also added as a destination for data being sent from the first destination node to the source node. A merge operation is performed for finding and combining common segments of the paths between the source and destination, the source and tapping point, and the destination and tapping point.

18 Claims, 4 Drawing Sheets

USE OF MULTIPOINT CONNECTION SERVICES TO ESTABLISH CALL-TAPPING POINTS IN A SWITCHED NETWORK

This application is a continuation of application Ser. No. 08/370,158, filed on Jan. 9, 1995 entitled USE OF MULTIPOINT CONNECTION SERVICES TO ESTABLISH CALL-TAPPING POINTS IN A SWITCHED NETWORK which issued as U.S. Pat. No. 5,627,819 on May 6, 1997.

FIELD OF THE INVENTION

This invention relates to communication networks, and more particularly, to a method and apparatus for providing call-tapping functionality in a switched network environment.

BACKGROUND OF THE INVENTION

In a switched network environment, such as a telephone system, packet-switched data network, or asynchronous transfer mode (ATM) network, it is useful to be able to "tap" into calls in progress. In today's telephone networks, tapping is used primarily for surveillance purposes in compliance with state or federal regulations. In a data network, however, there is another compelling use for a "tap" facility: the diagnosis of protocol problems between different systems on the network. This has traditionally been done by applying a "probe" or "analyzer" to one of the links across which the conversation is occurring and filtering the data to expose the conversation of interest. The problem with this approach is that the "probe" as well as the expert who is interpreting the data, must be located at a tappable point on the correct link. This requires the movement of equipment and personnel and is time consuming, expensive and impractical in many situations. It also requires special "tap-points" to be available on the link or disruption of the link to insert the probe.

Many modern packet and cell-switches provide the capability of programming multipoint connections, i.e., connections for which data, when received by the switch, is sent out more than one port. These are used, for example, to create point-to-multipoint connections, such as described in the ATM-Forum UNI (User-Network-Interface) Specification. A point-to-multipoint connection has a single data source, but multiple receivers of the data.

It would be desirable to provide a tapping function that was not limited to special "tap-points" on the network and which did not require the insertion of special equipment at a designated location. Ideally, it would be desirable to have the ability to monitor any conversation occurring on the network at any one of a number of different locations, without requiring the insertion of a probe or the presence of an expert technician at a specified location.

It is an object of the present invention to provide a ubiquitous call tapping facility in a switched network which utilizes the network's own multipoint connection services.

SUMMARY OF THE INVENTION

The present invention is a new application of a multipoint connection service on a switched network environment for the purpose of providing a ubiquitous call tapping facility. More specifically, the invention provides a method for creating a tap point for monitoring a conversation occurring between any source node and any destination node in the network. The network includes switches having multipoint functionality and a connection services entity that provides a network path in response to a first node input and a second node input. The method includes the steps of invoking the connection services entity with the source node and the tap node as the first and second node inputs, to yield a source/tap path. In the next step, the network switches are configured to form a point-to-multipoint connection from the source node to the destination node and to the tap point. Then, the conversation from the source to the destination node can be monitored at the tap point. The tap point is independent of the source and destination nodes and can be any node on the network.

In a preferred method, the source/tap path is "merged" with the existing path between the source and destination nodes. The merger operation finds one or more parts of the paths which are in common, as well as the parts which have to be added. In one embodiment, the merge function may find the longest existing path segment which is common with the source/tap path. The switches within the common portion do not need to be modified as they are already set to forward the data to that point, but new connection table entries must be created for all switches from the point where the two paths diverge. The first divergence switch will be configured to forward the data out multiple ports. Connections are then added to all the remaining switches in the source/tap path to form the complete connections.

Another important aspect of the present invention is the use of an "inverted merge" operation for monitoring the conversation back from the original destination node to the original source nodes. In this embodiment, tapping requires that the data from both ends of the target conversation are delivered to the tapping end point.

More particularly, obtaining the data from the destination side of the conversation requires selecting a destination/tap path from the tapping end point to the destination end point and then performing an inverted merge of the paths. The inverted merge may find the longest common path segment starting from the original destination node of the path and working back towards the original source node. It then programs the uncommon portions of the path (since data is already present on the common portions). Thus, when data destined for the original source of the connection reaches the diverging switch, it is switched not only to the source, but also the tapping end point.

Thus, the present invention is the first known application of multiple destination mapping for the purposes of establishing a tap point. Second, it is a new use of the point-to-multipoint connection capability for forming the source side of the tap. Third, it is a new method, i.e., the inverted merge, for tapping into the destination to source traffic of a connection. Fourth, it presents a unified function, "tapping," which combines two separate connection operations into a single user level function. These and other functions and benefits of the present invention will be more fully described in the following detailed description.

DETAILED DESCRIPTION

The call-tapping operation of this invention can be installed onto an active connection in a switched network, where the switches support multipoint connections. The present invention allows a tap to be directed to any destination within the networks. This allows for example, a protocol expert to direct the contents of a given conversation to a computer in his/her office even though the office may be far removed from the end points or transit switches involved in the conversations. Thus, a conversation may be monitored from any point in the network without the need to install specialized equipment. The invention specifically covers the connection processing technique employed to perform the tap function as embodied by a Connection Services Entity.

The call-tapping feature of the present invention will be described below in the context of the connection services and multipoint functionality of a secure fast packet switching (SFPS) network described in copending and commonly owned U.S. Ser. No. 08/188,238 filed Jan. 28, 1994 by K.Dobbins et al., entitled "Network Having Secure Fast Packet Switching And Guaranteed Quality Of Service," which issued as U.S. Pat. No. 5,485,455 on Jan. 16, 1996 and which is hereby incorporated by reference in its entirety. Those skilled in the art will appreciate that the invention described herein is applicable to other switched network systems having multipoint functionality, and that it is in no way limited to the SFPS network. The SFPS network is illustrated for description purposes only.

A general description of the call-tapping operation will first be provided.

A. Definitions

The following definitions are used in describing the call-tapping operation:

Connection Services—A software component which is responsible for accepting connection requests and setting the switches' connection tables so as to form the requested connections.

Switch—A device which provides two or more 'ports' and accepts data (e.g., voice, video, computer information) in certain ports and forwards it out one or more other ports based on the contents of its 'Connection Table.'

Connection Table—A logical table within a switch which can be set by a 'Connection Services Entity' and controls the behavior of the switch. The connection table contains a list of entries which describe individual connections. The canonical form for a connection table entry is: (in-port, in-header) maps to (out-port, out-header), though not all fields need to be supported in a given implementation and the actual structure may vary.

Port—A logical or physical point of entry and/or exit of data to/from a switch.

B. Connection Services

The Connection Services Entity (CSE) contains a model of the topological elements present in the network as well as their inter-connections. This topology consists of switches, endpoints and links (see e.g., FIG. 3) and may be auto-discovered, manually configured or derived from any combination of sources. Connection requests may originate from network user requests or may be requested by the network administrator. Requests from the network users are known as Signalled Requests while requests from the network administrator are known as Management Requests. When a request is received, an appropriate path is chosen through the topology from the connection source to the connection destination by analyzing the topological model within the CSE (see the following example under "Best Path Determination"). This path is composed of switch-port pairs organized as (in-port, out-port). Each of these port pairs is known as a path-node. Depending on the particular switching technology employed, packet or cell headers may also be allocated for each port. The connection is formed by programming a connection table entry for each switch in the path such that data arriving at the in-port with the designated header will be forwarded to the out-port. By programming these entries for each of the nodes in the path, a connection is formed such that data injected at the source endpoint with the appropriate header will find its way to the destination endpoint. In a preferred embodiment described herein, the connection tables are actually programmed in both directions such that data injected by the destination endpoint will also arrive at the source endpoint.

By way of example only, a topology model of the network may be provided by a network management application such as the Spectrum™ advanced network management platform sold by Cabletron Systems, Inc. of Rochester, N.H., and described in U.S. Pat. No. 5,261,044 to Dev et al. which issued Nov. 7, 1991, and is hereby incorporated by reference in its entirety.

C. Creating A Source Tap

Current switched networks have the ability to add destinations to a connection. These procedures are described for example within the ATM-Forum's UNI 3.0 Specification.

In accordance with this invention, tapping a connection requires that the data from at least one end of the target conversation be delivered to the tapping endpoint. Obtaining the data from the source side of the conversation is a fairly straight forward (although novel) application of the point-to-multipoint technology; by adding the tapping endpoint as a new destination, any data sent by the source will automatically be received at the tapping endpoint.

In a preferred embodiment of this invention, adding destinations is achieved by selecting a path between the original source and a new destination (i.e., the tap point) and then 'merging' that path with the existing path (i.e., between the original source and destination nodes) in order to find the parts of the paths which are in common as well as the parts which have to be added. The merge function finds a common initial path segment which is in common between the two paths. The switches within the common portion do not need to be modified as they are already set to forward the data to that point, but new connection table entries must be created for all switches from the point where the two paths diverge. The first divergent switch will be programmed to forward the data out multiple ports (i.e., one in-port/in-header maps to multiple out-ports). Connections are then added to all the remaining switches in the new path to form the complete connection. At that point, any data sent by the source endpoint will be received by the new destination (tap point) as well as the original destination. As one or more destinations are added, a distribution tree is formed such that the data is transmitted over each common link once (as path segments are shared), and network resources are conserved.

D. Creating A Destination Tap

Obtaining the data from the destination side of the conversation requires a new technique. The present invention does this by first selecting a path from the tapping endpoint to the destination endpoint and then performing an inverted merge of the paths. The inverted merge finds a path segment in common starting from the destination end of the original path (since data is already present on the common portions). A new connection on the diverging switch is programmed to the tap point. Thus, when data destined for the original source of the connection reaches the diverging switch, it is switched not only to the source, but also to the tapping endpoint. The same efficiency characteristics that applied to the point-to-multipoint connections above also apply to the destination tapping connections.

Adding a tap is thus a two-step process: first add the tapping user as a destination to the original call and then providing an additional connection from the destination of the original call to the tapping user.

E. Call Tapping Example

Figure 1:
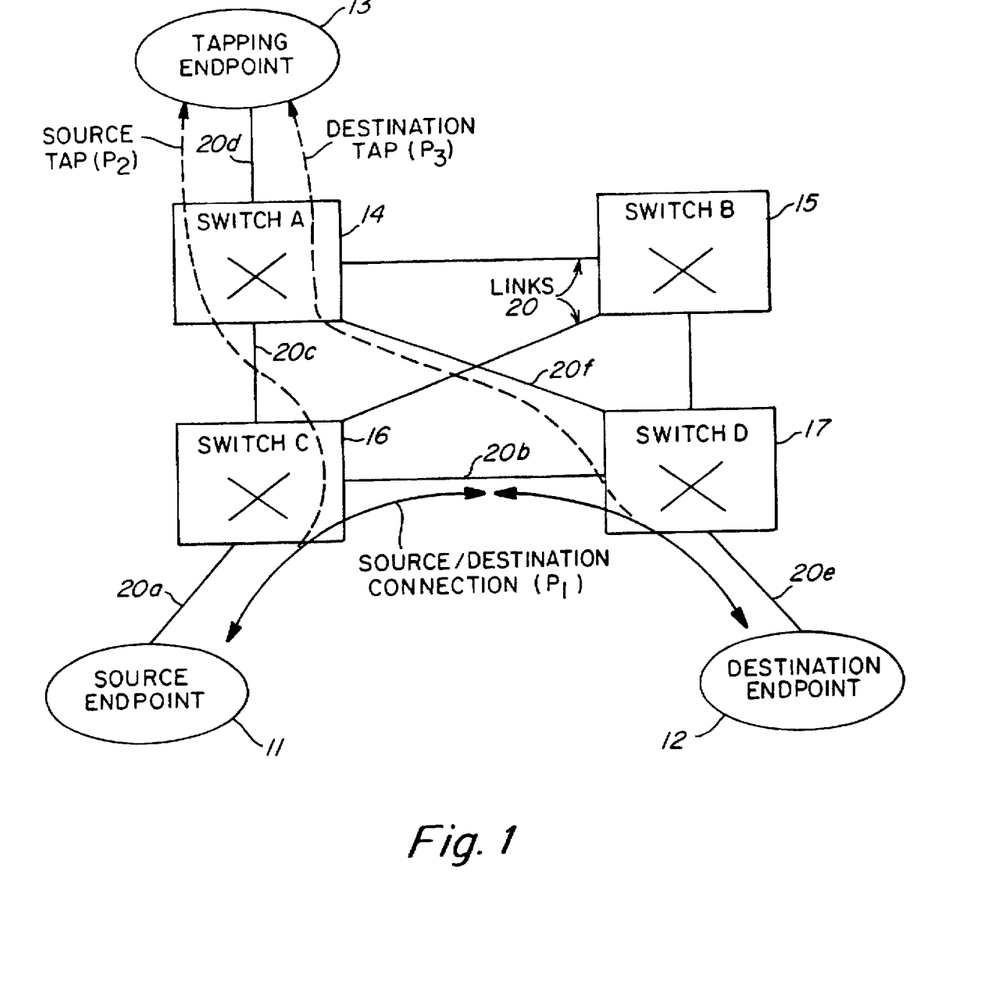
FIG. 1 is a schematic illustration of the establishment of a call-tapping endpoint for monitoring conversations between a source endpoint and a destination endpoint in a switched network in accordance with the present invention.

FIG. 1 illustrates an example of the call-tapping operation of this invention. More specifically, FIG. 1 shows a representative network having a source endpoint 11, a destination endpoint 12, and a tapping endpoint 13. The network further includes switches A, B, C, D (14–17), and links 20 connecting the endpoints and switches.

A source/destination connection ($P_1$) is first determined by invoking the connection services for the purpose of setting up a point-to-multipoint call, and providing the initial source endpoint 11 and first destination endpoint 12 for the call. The connection services may utilize any of the known path determination algorithms, such as the Dijkstra algorithm, or the specific algorithm described in the later section entitled "Best Path Determination." In the context of the specification, a "best path" is meant to include one or more alternative paths selected on the basis of one or more constraints, e.g., cost, number of hops, network traffic, etc. Then, the connection service programs all of the switches in the first path $P_1$, i.e., switches C and D (16–17), thereby establishing a virtual circuit between the source endpoint 11 and destination endpoint 12.

Next, a second path $P_2$ is determined from the source endpoint 11 to the tapping endpoint 13, again by invoking a connection service to determine the best path from 11 to 13. In this example, the second path $P_2$ extends from source endpoint 11, through switch C (16), switch A (14), to tapping endpoint 13. In accordance with the merge operation, the initial common segment of the first path $P_1$ and second path $P_2$ is determined to be the first link 20a between source endpoint 11 and switch C (16). The point of divergence, switch C, is programmed to transmit the data received from source endpoint 11 out two ports, one onto link 20b which is transmitted to switch D (17) and destination 12, and another out link 20c which is transmitted to switch A and tapping endpoint 13. The connection service also programs switch A to transmit the data received from link 20c out a port connected to link 20d and to the tapping endpoint 13.

Now that a point-to-multipoint connection has been established from source endpoint 11 to destination endpoint 12 and tapping endpoint 13, a user can monitor the data sent from source endpoint 11 intended for destination endpoint 12. In order to monitor the data going back from destination endpoint 12 to source endpoint 11, a third destination tap path $P_3$ must be added. Again, the connection services is invoked to provide a path between tapping endpoint 13 and destination endpoint 12. Then, that path is merged with the first path $P_1$, starting at the destination endpoint 12. In this case, there is a common segment over link 20e, and switch D (17) becomes the point of divergence. Switch D (17) is programmed to transmit the data from destination endpoint 12 out of two ports, one onto link 20b which returns to source endpoint 11, and another out link 20f which is transmitted to switch A (14) and tapping endpoint 13.

It should be understood that FIG. 1 shows only one example of a network topology and path determination. Many other types of network topologies and/or path determinations with relatively lesser or greater common path segments are intended to be covered by the present invention.

F. Call-Tapping Algorithm To Merge Circuits

Figure 2:
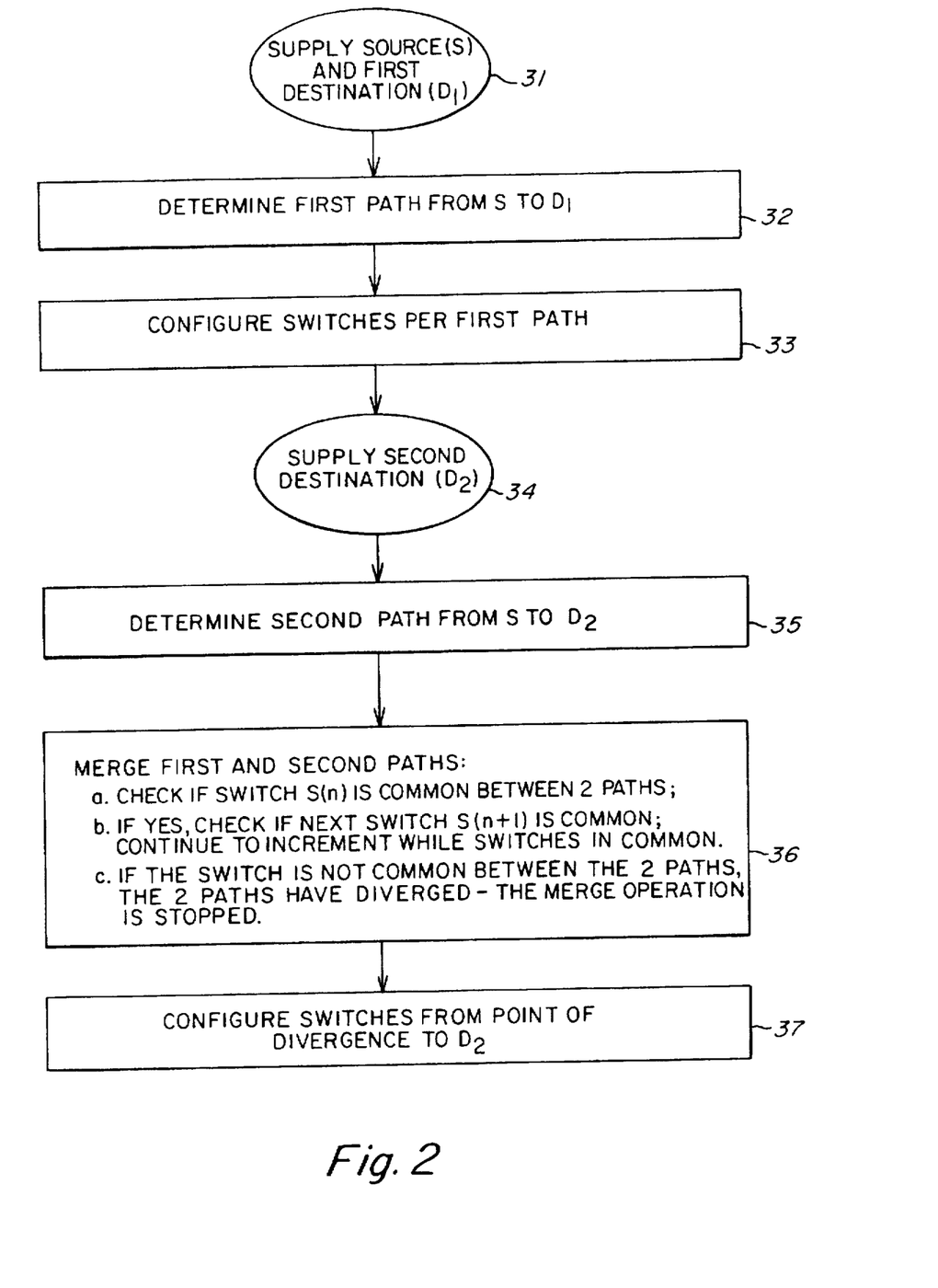
FIG. 2 is a flow chart showing the steps of the merger operation for combining first and second network paths in accordance with the present invention.

FIG. 2 illustrates generally the steps followed in performing the call-tapping operation as follows:

1. The user indicates to the connection services an intention of setting up a point-to-multipoint call, and provides the initial source (S) and destination ($D_1$) for the call (step 31).
2. The connection services uses an algorithm to find the best physical path ($P_1$)—a series of switches and links—between the source (S) and the destination ($D_1$) (step 32).
3. The connection services programs all the switches in the path ($P_1$), thereby establishing a virtual circuit between the source and destination (step 33).
4. The user asks the connection services to add a new destination ($D_2$) to the call (step 34).
5. The connection services uses an algorithm to find the best physical path ($P_2$) between the source (S) and the new destination ($D_2$) (step 35).
6. The connection services does a (forward) merge of the new path ($P_2$), with the first path ($P_1$)(step 36):
   a. it checks if a first switch is common between the 2 paths;
   b. if it is, it checks the next switch in the 2 paths, and so on;
   c. if the switch is not common between the 2 paths, the 2 paths have diverged—the merge operation is stopped.
7. The connection services program the switches in the new path ($P_2$) from the point of divergence to the destination ($D_2$), thereby establishing a new virtual circuit from the source S to the new destination ($D_2$). This new circuit reuses the resources of the first circuit from the source to the point of divergence of $P_1$ and $P_2$ (step 37).
8. Optional step (not shown): If the user asks the connection services to add a third destination ($D_3$) to the call, the connection services again uses the algorithm to find the best physical path ($P_3$) between the source (S) and the new destination ($D_3$), and does a (forward) merge of $P_3$ first with $P_1$, and then with $P_2$; the connection services then program the switches from the farthest point of divergence to the destination ($D_3$).

G. Fast Packet Switching Network Example

Figure 3:
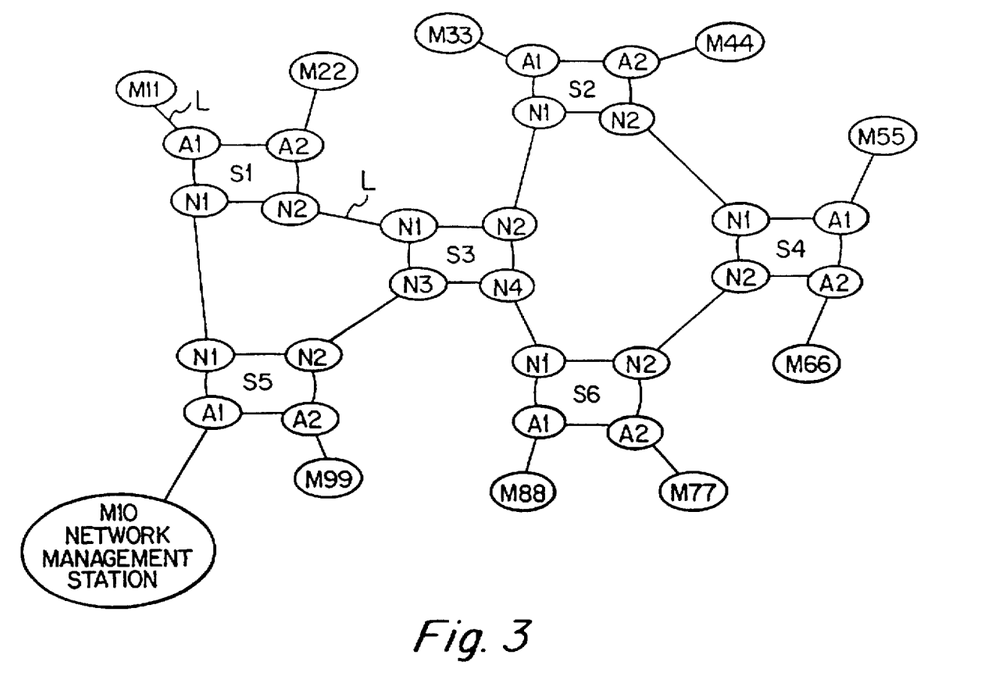
FIG. 3 is a schematic illustration of a specific embodiment of a network topology built with a plurality of fast packet switches, in which the present invention may be utilized.

FIG. 3 shows a representative network topology built with six secure fast packet switches (SFPS) labeled S1 to S6; this example is in accordance with the description in U.S. Ser. No. 08/188,238, previously incorporated by reference. Each SFPS switch has, for example, four ports. Some ports are labeled A for access, and some are labeled N for network. Access ports provide network access security and packet routing services. Network ports do not perform security services since this function has already been performed at the original entry access port. The end systems are labeled M; one of the end systems M10, comprises a network management server (NMS). The NMS may contain the connection services entity.

Each SFPS includes a function known as a connection database lookup engine (CDLUE). The CDLUE's job is to check the source and destination MAC ID's of a packet received by the SFPS against its internal database, called a connection table. The CDLUE will forward (route) packets out one or more ports based on the results of the connection table look-up.

For example, suppose M11 transmits a packet destined for M99. Access switch S1 receives this packet on inbound port A1. S1 looks up in its connection table to determine if a valid connection (M11 to M99) exists. If no connection is yet defined, S1 initiates a message exchange to the network server (M10). The switch S1 sends a message asking if M11 can (is allowed) to talk to M99. At this point security, policy and administrative constraints may be applied. If the two stations are allowed to have a connection, then the server M10 will determine the path of the switches to be used to provide a logical connection between M11 and M99. Since M11 can reach M99 by more than one path, one "best" path is selected. "Best" is constrained by, for example, cost, bandwidth, policy, loss, and other metrics. An actual algorithm for determining a best path is described in the previously identified Ser. No. 08/188,238, and discussed in the following section. For present purposes, assume that the best path is chosen as traversing S1 to S3 to S5. The server M10 will then "program" each of these switches to support this connection path. Thus, once all of the switches are programmed, through for example SNMP (Simple Network Management Protocol), a packet from M11 destined for M99 would be "switched" along the path as follows:

M11→A1-S1-N2→N1-S3-N3→N2-S5-A2→M99

Note than once the switches have these connections defined, the packets traverse M11 to M99 without any additional call-setup or network management interaction. This provides the fast packet switching between the end systems.

At each switch, the switch looks up in the packet the source and destination MAC addresses and combines them with the inbound (source) port to form a connection identifier. If this connection is in its table, the packets will be forwarded (switched) out the designated output port. All subsequent M11 to M99 packets will take the same path through the switches. Note that if a valid source-destination MAC pair arrives on a port other than the defined end port, it will be considered a security violation and will not be forwarded.

These "virtual connections" from the source to the destination exist until they are specifically removed by the network management systems. This could be due to time out (idle connection) or resource management.

H. Fast Packet Switch Operation

Figure 4:
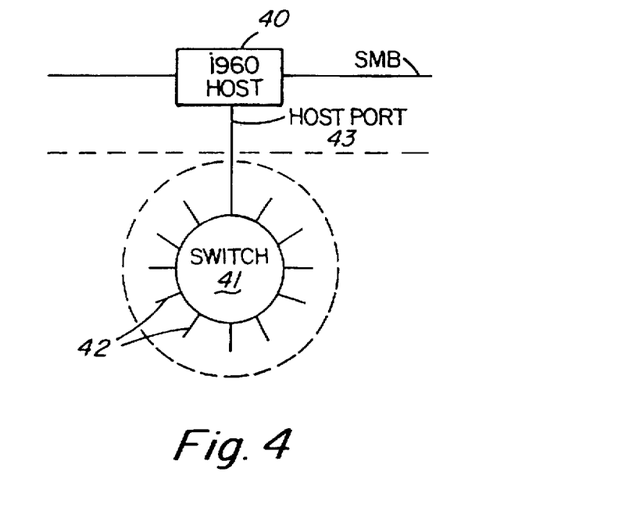
FIG. 4 is a schematic illustration of one fast packet switch and its host agent connected to a system management bus.
Figure 5:
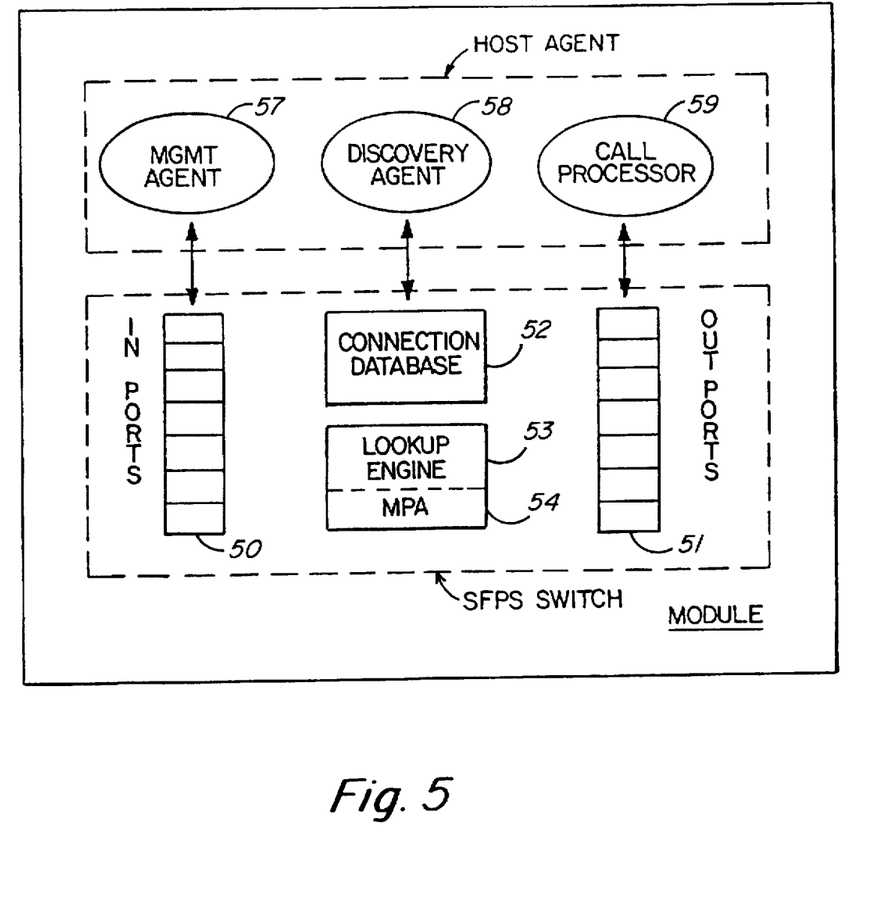
FIG. 5 is a schematic illustration of the internal components of a fast packet switch.

The internal operation of the SFPS and its host agent is illustrated in FIGS. 4–5. FIG. 4 illustrates a SFPS switch 41 having a plurality of ports 42. A host port 43 connects the switch with a host CPU 40, which may be an i960 microprocessor sold by Intel Corporation. The host CPU (40) is connected to a system management bus (SMB) for receipt and transmission of discovery and other control messages.

FIG. 5 illustrates the internal operation of the switch. The SFPS switch includes in-ports 50, out-ports 51, a connection database 52, a lookup engine 53, and a multilevel programmable arbiter MPA 54. When data arrives at a given port, the port signals to MPA 54 that it is ready to transfer data into the SFPS. The MPA is used to allow each port a "timeslice" on the packet data bus so that data may be transferred into the SFPS and stored into packet ram. When the input port receives an acknowledgment from the MPA 54, it signals a "start of frame" on a control bus which informs the lookup engine that the beginning of a data packet will be traversing the packet bus and that it should copy the destination and source fields so that it may proceed with the lookup operation. The packet bus also indicates which port is transferring the data into the packet ram; this information is used by the lookup circuitry so that it may associate the destination/source data with a certain inbound port. The lookup circuitry is where the connection database table is maintained. It indicates for a particular destination/source pair on which port(s) the data shall be sent outbound. The table also provides a field that identifies the allowable inport 50 for this destination/source connection. The lookup process passes an information structure to a forwarding logic, and the forwarding logic acts on this data to produce an "outmask." This mask, which is as wide as the number of ports in the system, indicates the desire to forward the data packet out on specified ports.

As illustrated in FIG. 5, the switch sends and receives messages from a host agent, which includes a management agent 57, a discovery agent 58, and a call processing agent 59.

The management agent 57 provides external control of the configuration and operation of the SFPS switch, through the management system. It also collects statistics regarding transmission through the switch and sends them to the system connection services.

The discovery agent 58 provides a mapping of end systems to switching ports through a passive listening (snooping) capability and a registering of end system addresses and port locations of the host switch with an external directory located in the Connection Services Entity. Adjacent switches are also discovered and mapped, but this may be done with an explicit switch-to-switch protocol (non-passive).

The call processor 59 provides a means for requesting connections to be established between two end systems.

Once the destination MAC address is known, the call processor 59 makes a CALL-REQUEST on behalf of the source. The Connection Services Entity validates the call according to, e.g., policy, access control, quality of service, etc. It determines the path to connect the source and destination and then programs each switch in the path with a valid connection. A connection is a combination of source port, source MAC, and destination MAC mapped to an outbound port. The Connection Services Entity may use SNMP and switch MIBs to do this; there is no signalling per se. The Connection Services Entity then returns a call accepted to the call processor. The call processor sends a response to the source end system. The source end system now has an updated cache and can send packets directly to the destination end system. These packets get switched through each switch along the path as programmed by the SCS.

I. Best Path Determination

A principal function of the Connection Services Entity is to determine a "best" path through the switches for a given set of metrics. This is important to ensuring "fast"

transmissions, avoiding bottlenecks (excessive traffic on the back plane), and guaranteeing quality of service. A variety of best path search methods are known, and can be used in this invention. A preferred search method is described in the copending U.S. Ser. No. 08/188,238, described above, and incorporated herein by reference in its entirety.

The preferred search method can be described as a concurrent breadth first path search through a mesh of nodes and arcs—see for example the network topology or mesh of FIG. 3 wherein the switch S and end point systems M would be nodes, and the links L between nodes would be arcs.

The problem to be solved is to find a path between any two points in the mesh that has the following properties. The path is optimal for one metric and passes a set of threshold tests for n other metrics. Mathematically the desired path $Q_i$ of all the paths $Q_o, \ldots, Q_z$ is the one whose value v is the best and whose values a, . . . , n all pass threshold tests A, . . . , N. Secondarily, it must do this within a minimum time constraint T.

The method assumes an initial set of values and accumulates additional values following the traversal of all nodes and arcs along a path until the path arrives at the destination or goal node. The method was developed to satisfy the requirements of ATM route determination.

These traversals and accumulations may be done by traversing and accumulating values from a topological model of the system, rather than from transversing the actual system.

The topological model will include the switches, end points, and links of the network. The model itself may be constructed through auto-discovery (i.e., the system elements tell the NMS or other entity holding the model of their existence, and the NMS or other entity constructs the model therefrom), manually configured, or derived from a combination of sources.

The method will first be described generally.

As paths are expanded during a discovery process, (n+1) metrics are altered in a monotonically increasing or decreasing function. This is what makes the metrics useful. Since some metrics increase or remain the same for each traversal and some decrease or remain the same, it is confusing to describe them in terms such as larger, smaller, etc. Therefore, we will use the terms best, better, worse, and worst. For example, a cost metric can be best when it is 0 and worst when it is some maximum positive value. Probability, on the other hand, is best when it is 1 and worst when it is 0. A metric which is measured in absolute value (i.e., Impulse fct) would be best at 0 or infinity depending upon your viewpoint (i.e., is the impulse desirable or undesirable). At initiation there is a vector of metrics which is applied at the source node. At each traversal of a node or arc this vector of values is modified and produces a traversal value which accumulates from a best state to a worst state.

The method is a breadth first recursive search in parallel. It is initiated at a source node with an initial set of values and proceeds until there are no further paths to explore. It starts with a list of all the neighbors (neighboring nodes) of the source node. It then processes that list producing another list of all the neighbors of neighbors, etc. It uses several methods of "pruning" to keep the number of potential paths explored from growing unacceptably. A significant feature of this method is the pruning steps.

As each node is discovered, a traversal value vector is recorded for that node. Each time the destination node is discovered, the traversal value vector is recorded.

When a path discovers a node already within the path, it terminates itself. This prevents cycles and prevents infinite loops. If a path discovers that its traversal value vector is not best in any of the (n+1) metrics, it terminates itself. When a path traversal value vector has no metric which is better than one of the already completed paths, it terminates itself. Any path which would traverse a disabled arc or node, terminates itself. Any paths whose traversal value vector fails the filters (threshold value) in any metric terminates itself. Any path which encounters an end node (i.e., a node which does not forward traffic, but may be a source or sink for traffics which is not the destination node, terminates itself.

For each successive traversal list, all the paths going to a single node are grouped together before processing. Any of these paths which is not better than the others in at least one metric is terminated.

With the above pruning steps, only paths which can potentially produce a best result in some metric are allowed to proceed towards the destination. If a filter should knock out a promising path, the less promising paths will not be blocked as they are in Djikstra (i.e., Djikstra's short path algorithm with filtering). If any path can successfully pass the filters, it will get through since all paths which are best at something are allowed to continue.

Once there are no more paths to process, all the successful paths are scanned selecting the path which best fits the desired result for presentation as the final answer.

The above steps comprise the most aggressive pruning; a subset of these steps may be used for less aggressive pruning.

While there have been shown and described several embodiments of the present invention, it will be obvious to a person skilled in the art that various changes and modifications may be made therein without departing from the scope of the invention as defined by the appending claims.

We claim:

1. A method of providing a merged path from a source node to a plurality of destination nodes in a switched network having connection services which provide a point-to-multipoint connection, the method comprising steps of:

(a) invoking the connection services to provide a first connection path between a source node and a first destination node;

(b) configuring at least one network switch in accordance with the first connection path to form a connection from the source node to the first destination node;

(c) invoking the connection services to provide a second connection path between the source node and a second destination node;

(d) performing a forward merge of the second connection path with the first connection path including the steps of:

determining if a first switch is in common between the first and second connection paths;

if the first switch is in common, merging a first common segment of the first and second connection paths from the source to the first switch;

continuing to determine if a next switch is in common between the first and second connection paths and if so merging a next common segment until the first and second connection paths have diverged;

if the next switch is not in common, determining that the two connection paths have diverged at a first point of divergence and stopping the merge operation; and (e) configuring at least one network switch in the second connection path from the first point of divergence to the second destination node so as to form a point-to-multipoint connection from the source node to the first and second destination nodes by programming a connection table in the at least one network switch.

2. The method of claim 1, wherein step (e) comprises:

programming the at least one network switch to forward data received on a first inport out to at least two outports.

3. The method of claim 2, wherein step (e) comprises:

modifying an entry in a connection table of the at least one network switch to logically map the first inport to the at least two outports.

4. The method of claim 1, wherein each connection path is selected based on one or more metrics.

5. The method of claim 4, wherein the metrics include cost, speed, network traffic and quality of service.

6. The method of claim 4, wherein each connection path is optimal for one metric and passes a set of threshold tests for other metrics.

7. The method of claim 1, wherein the first common segment is a longest common segment.

8. The method of claim 1, wherein:

the network is a telephone network.

9. The method of claim 1, wherein:

the network is a packet-switched data network.

10. The method of claim 1, wherein:

the network is an asynchronous transfer mode (ATM) network.

11. The method of claim 1, wherein the merged path is used for monitoring the switched network for surveillance.

12. The method of claim 1, wherein the merged path is used for analyzing network problems.

13. The method of claim 1, wherein:

the data includes one or more of voice, video and computer information.

14. A method of providing a merged path from a source node to a plurality of destination nodes in a switched network having connection services which provide a point-to-multipoint connection, the method comprising steps of:

(a) invoking the connection services to determine a first connection path between the source node and a first destination node including network switches in the first connection path in an order from the source node to the first destination node;

(b) invoking the connection services to determine a second connection path between the source node and a second destination node including network switches in the second connection path in an order from the source node to the second destination node;

(c) performing a forward merge of the first and second connection paths, including steps of:

(d) selecting a current network switch from the first connection path in the first order;

(e) determining whether the selected current network switch is in both the first and second connection paths;

(f) when the selected current network switch is in both the first and second connection paths: configuring the selected current network switch according to the first connection path, identifying the selected current network switch as a previous network switch, selecting a next network switch from the first connection path as the current network switch and repeating step (e);

(g) when the selected current network switch is not in both the first and second connection paths: configuring the previous network switch so as to form a point-to-multipoint connection from the source node to the first destination node and to the second destination node, configuring unselected network switches in the first path in accordance with the first connection path and configuring unselected network switches in the second connection path according to the second connection path.

15. The method according to claim 14, wherein the step of configuring the selected current network switch within step (f) includes a step of modifying a connection table of the selected current network switch to logically map a first inport to a first outport according to the first connection path.

16. The method according to claim 14, wherein the step of configuring the previous network switch in step (g) includes a step of modifying a connection table of the previous network switch to logically map a first inport to first and second outports.

17. The method as recited in claim 14, wherein step (c) further comprises steps of:

when all network switches in the first connection path are determined to be in the second connection path, configuring a last selected network switch from the first connection path so as to form a point-to-multipoint connection from the source node to the first destination node and to the second destination node.

18. The method as recited in claim 17, wherein the step of configuring the last selected network switch from the first connection path includes a step of modifying a connection table of the last selected network switch to logically map a first inport to first and second outports.

* * * * *

UNITED STATES PATENT AND TRADEMARK OFFICE
CERTIFICATE OF CORRECTION

PATENT NO. : 5,754,532
DATED : May 19, 1998
INVENTOR(S) : Dev et al.

It is certified that error appears in the above-indentified patent and that said Letters Patent is hereby corrected as shown below:

Col. 2, line 27 - delete "nodes" and substitute -- node --

Col. 3, line 9 - delete "networks" and substitute -- network --

Col. 3, line 13 - delete "conversations" and substitute -- conversation --

Col. 10, line 9 - delete "traffics" and substitute -- traffic) --

Col. 3, line 9, insert a --,-- after "allows".

Signed and Sealed this

Fifth Day of October, 1999

Attest:

Q. TODD DICKINSON

*Attesting Officer*    Acting Commissioner of Patents and Trademarks